INVENTOR
HANS P. LUHN
BY Ralph C. Dustin
ATTORNEY

Nov. 2, 1954 H. S. LUHN 2,693,144

CODE OPERATED PRINTER

Filed Dec. 27, 1950 11 Sheets-Sheet 2

INVENTOR
HANS P. LUHN
BY Ralph C. Dustin
ATTORNEY

CODE OPERATED PRINTER

Filed Dec. 27, 1950 11 Sheets-Sheet 3

INVENTOR
HANS P. LUHN
BY Ralph C. Dustin
ATTORNEY

INVENTOR
HANS P. LUHN
BY Ralph C. Dustin
ATTORNEY

Nov. 2, 1954 H. S. LUHN 2,693,144

CODE OPERATED PRINTER

Filed Dec. 27, 1950 11 Sheets-Sheet 5

INVENTOR
HANS P. LUHN
BY Ralph C. Dustin
ATTORNEY

Nov. 2, 1954 H. S. LUHN 2,693,144

CODE OPERATED PRINTER

Filed Dec. 27, 1950 11 Sheets-Sheet 6

INVENTOR
HANS P. LUHN
BY Ralph C. Dustin
ATTORNEY

Nov. 2, 1954 H. S. LUHN 2,693,144

CODE OPERATED PRINTER

Filed Dec. 27, 1950 11 Sheets-Sheet 7

INVENTOR
HANS P. LUHN

BY Ralph C. Rustin

ATTORNEY

INVENTOR
HANS P. LUHN
BY Ralph C. Austin
ATTORNEY

INVENTOR
HANS P. LUHN
BY Ralph C. Dustin
ATTORNEY

Nov. 2, 1954 H. S. LUHN 2,693,144

CODE OPERATED PRINTER

Filed Dec. 27, 1950 11 Sheets-Sheet 10

INVENTOR
HANS P. LUHN
BY Ralph C. Dustin
ATTORNEY

Nov. 2, 1954 H. S. LUHN 2,693,144

CODE OPERATED PRINTER

Filed Dec. 27, 1950 11 Sheets-Sheet 11

INVENTOR
HANS P. LUHN
BY Ralph C. Rustin
ATTORNEY

United States Patent Office 2,693,144

Patented Nov. 2, 1954

2,693,144

CODE OPERATED PRINTER

Hans P. Luhn, Armonk, N. Y., assignor to International Business Machines Corporation, New York, N. Y., a corporation of New York Application December 27, 1950, Serial No. 202,988

8 Claims. (Cl. 101—96)

This invention relates to printing mechanisms, and more particularly to printing mechanisms of the rotating wheel type.

In some printing mechanisms which operate in response to the reading of perforations, there is provided a printing member which is moved to different printing positions in synchronism with the movement of index points on a card past a sensing station. Each card is usually provided with twelve uniformly spaced index points, numbered 1 to 9, 0, 11 and 12, which may be punched singly or in combination. The printing member is moved at a constant speed to present type elements 1 to 9 under a platen in synchronism with the movement of corresponding numeric index points past the sensing station. A sensing of a perforation at any one of the points results in a stopping of the printing member so that an impression may be taken from the element in printing position. If a perforation is sensed also at one of the points 0, 11 and 12 commonly referred to as zone points, the printing member is shifted to effect a printing of an alphabetic character which is represented by the combination of perforations sensed.

By constructing a printer which is operable to print all of the desired characters in response to the sensing of perforations at a smaller number of uniformly spaced card index points, it is possible to record a greater amount of data upon the card. In such case, however, each of the numeric index points must have a weighted value, and a sensing of a perforation at any one of these points may result in a movement of the printing member a distance proportional to the weighted value. Assume that a seven point code is employed with four of the points having weighted values of 5, 4, 2, 1 and the other three points acting as zone points which may be referred to as the X, Y and Z points. The printing member may be moved directly upon the sensing of perforations at any one or more of the first four points, and, if its movement is proportional to the weighted values, the number of printing positions obtained may be as large or larger than would be obtained from the reading of nine points by the first mentioned printers. The sensing of a perforation at any one of the zone points X, Y, Z, may effect a shifting of the printing member from any one of the positions at which it is moved by the sensing of perforations at the first four points.

It will be appreciated that a moving of the printing member different distances upon the sensing of perforations at uniformly spaced points requires a variable speed driving means. If a card is advanced past its sensing station at a uniform speed, then the printing member must be moved rapidly upon the sensing of a perforation at the No. 5 point, but its movement would be comparatively slow upon the sensing of a perforation at the No. 1 point. By feeding a card at slower speeds during the sensing of the Nos. 5 and 4 points, it is possible to obtain a positioning of the printing member at reasonable speeds in response to the sensing of perforations at these points while maintaining its speed comparatively high for the sensing of perforations at the other index points. With the drives for the printing member and the card feeding means both varied so as to reduce the differences between their limits, the reading of data and the setting-up of members to print the data may be completed in a smaller part of a machine cycle, leaving more time in the cycle for printing and the return of parts to their home positions.

An object of this invention is to provide an improved mechanism.

Another object is to provide an improved mechanism which is operable to print data in response to the reading of designations having different weighted values.

Another object is to provide a printing mechanism having driving means which is operable to move a printing member distances that are proportional to different weighted values of index points upon the sensing of perforations at such points.

Yet another object is to provide a printing mechanism having variable speed driving means both for a printing member and a card feeding device, the drive for the printing member being such as to move the latter distances proportional to different weighted values of index points upon the sensing of perforations at such points, and the drive for the card feeding device being such as to advance the index points having high weighted values past a sensing station at speeds which are slower than those at which the points of low value are advanced.

Other objects of the invention will be pointed out in the following description and claims and illustrated in the accompanying drawings, which disclose, by way of example, the principle of the invention and the best mode, which has been contemplated, of applying that principle.

Figs. 3*a*, 3*b*, 3*c* and 3*d* are front elevational views of the type wheels and the mechanism for controlling the operation of the wheels, the views showing parts in different operating positions.

Figure 1:
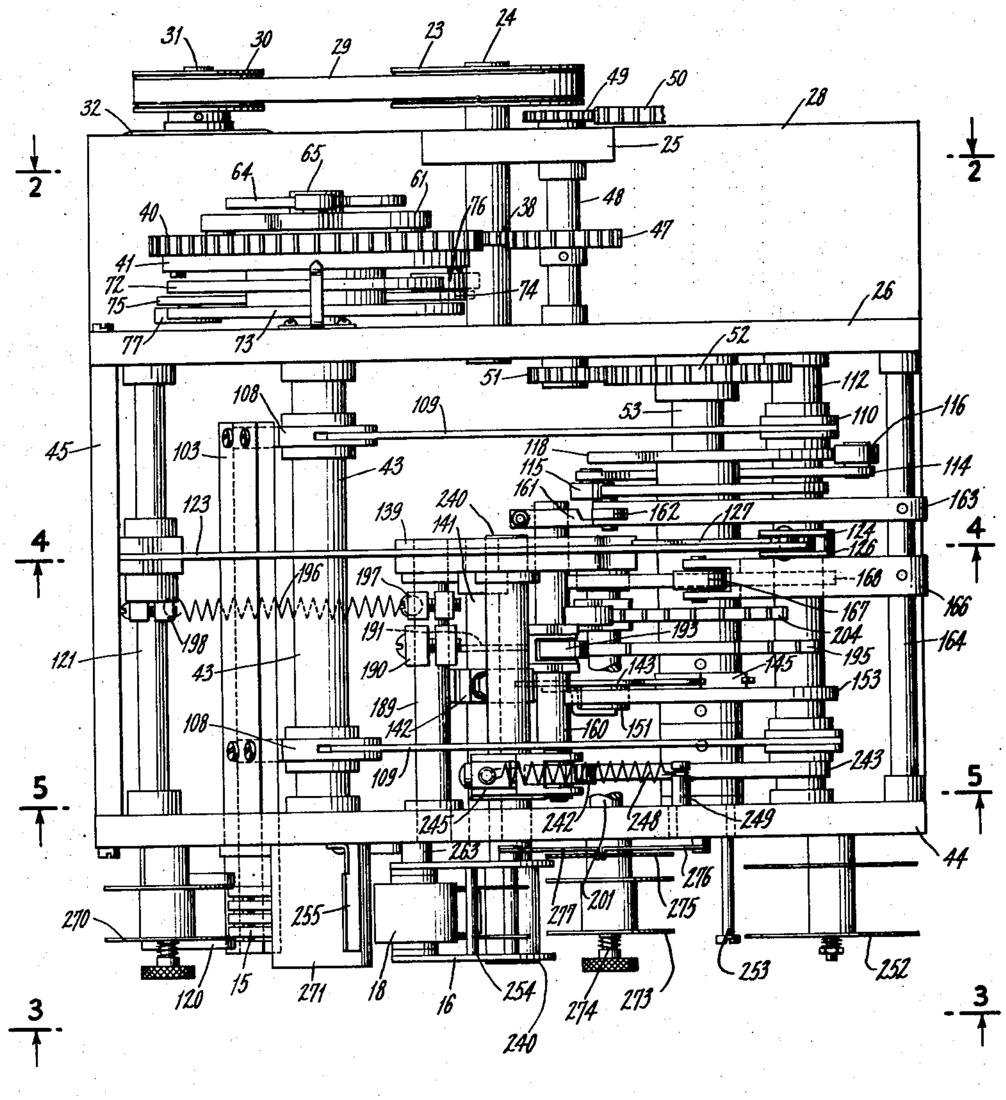
Fig. 1 is a plan view of the improved printing mechanism.
Figure 4:
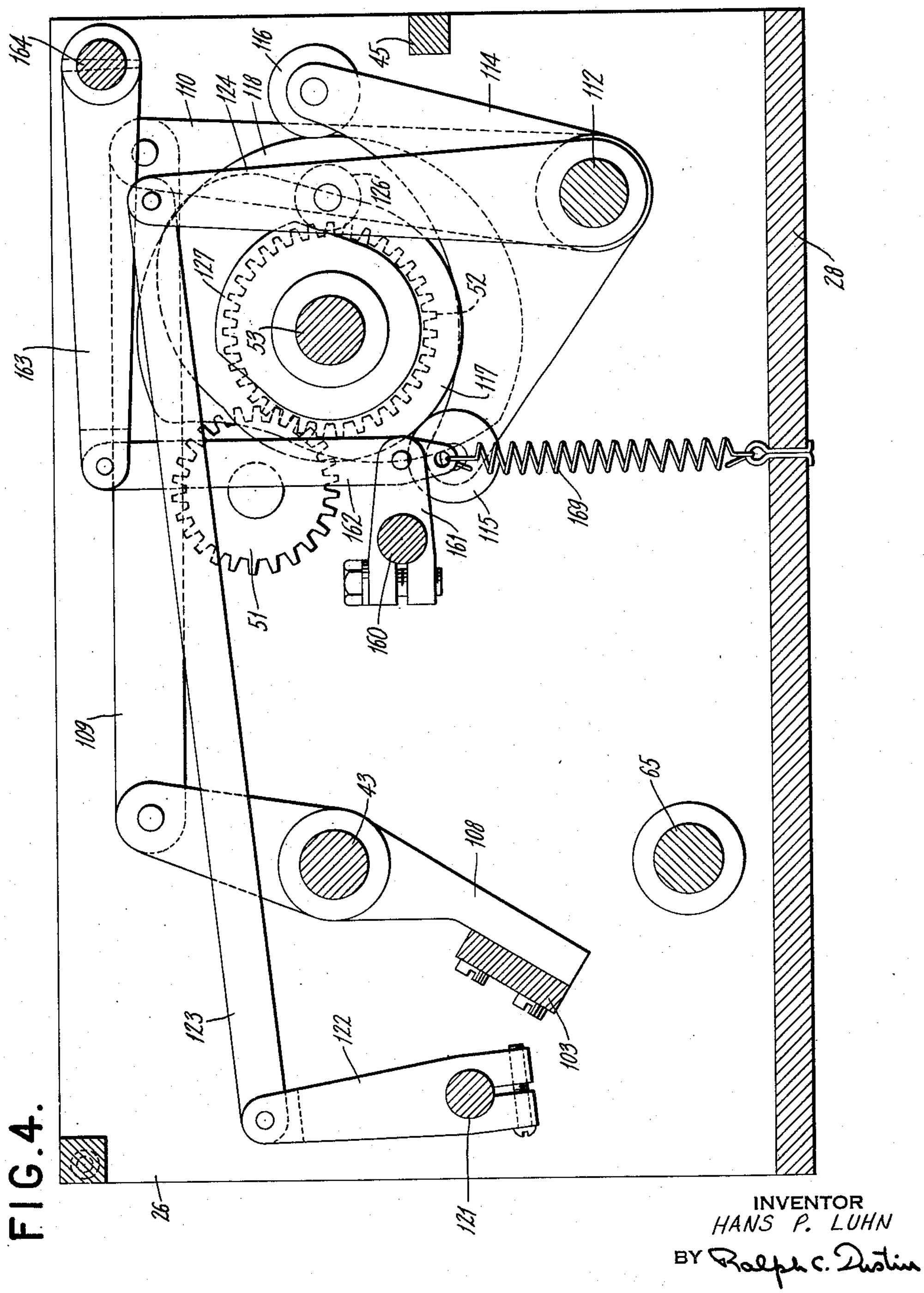
Figure 5:
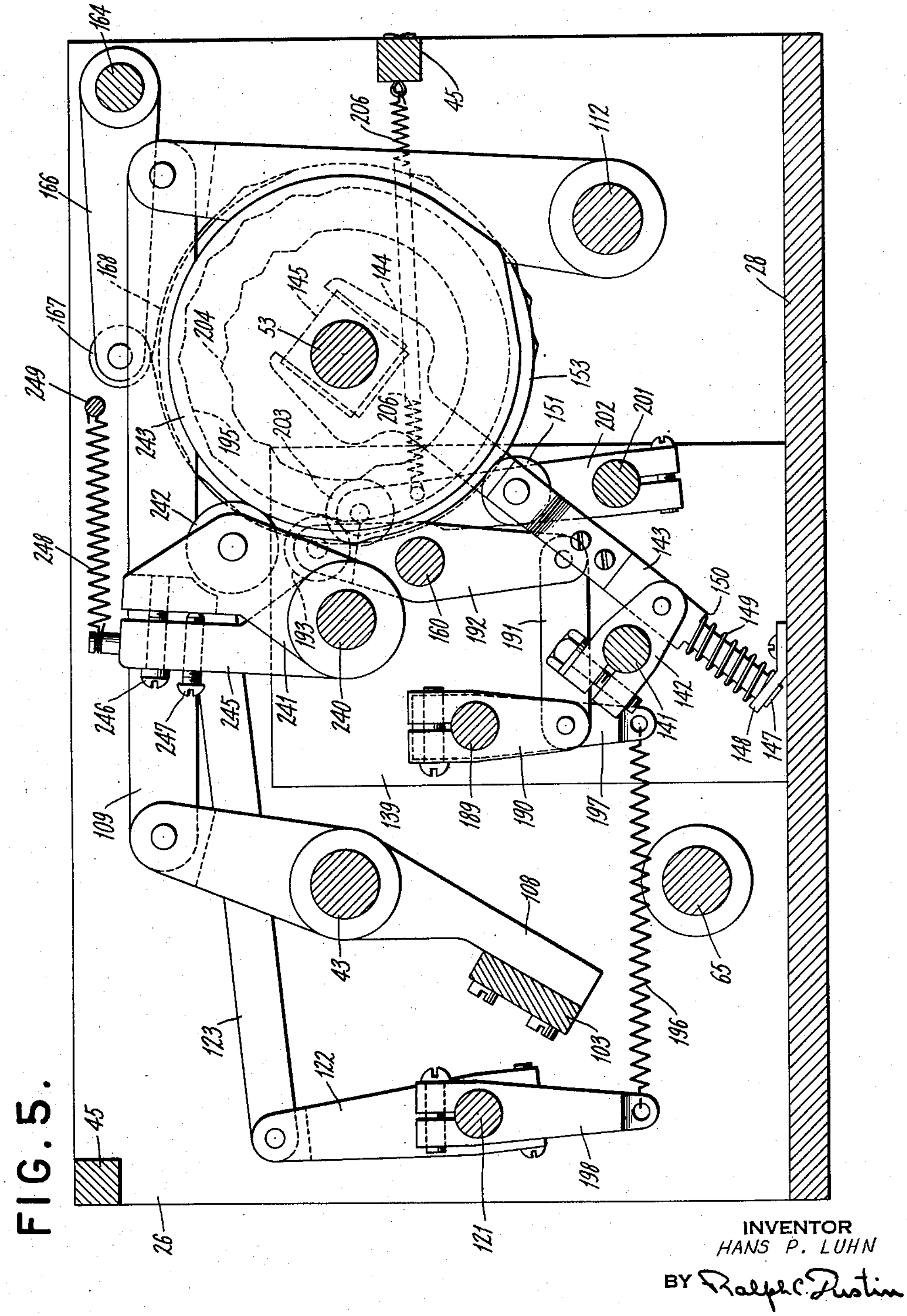

Figs. 4 and 5 are enlarged vertical sectional views taken on the lines 4—4 and 5—5, respectively, of Fig. 1.

Figure 6:
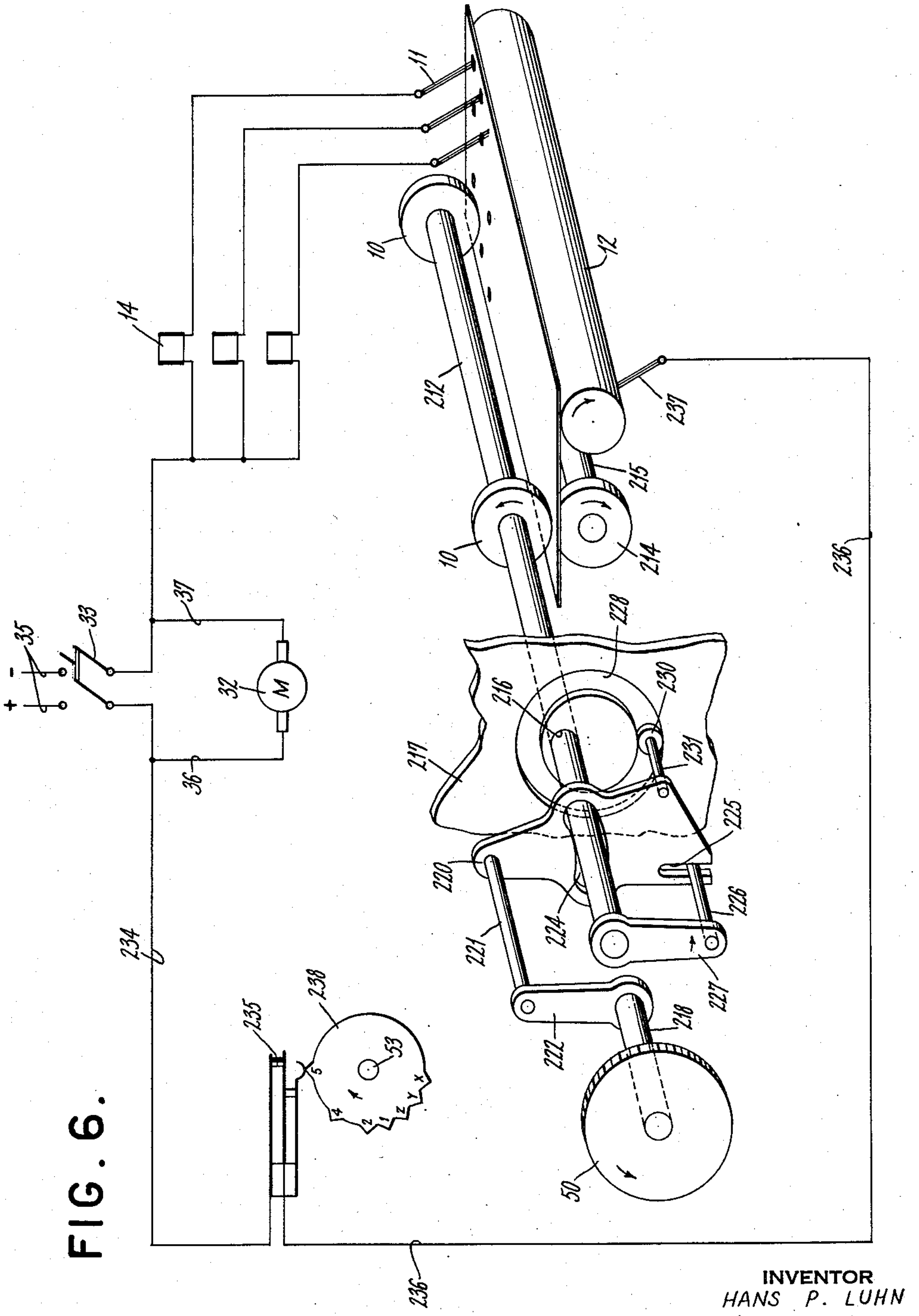

Fig. 6 is a schematic diagram showing the card feeding means and the circuits connected to the card sensing means.

Figure 3:
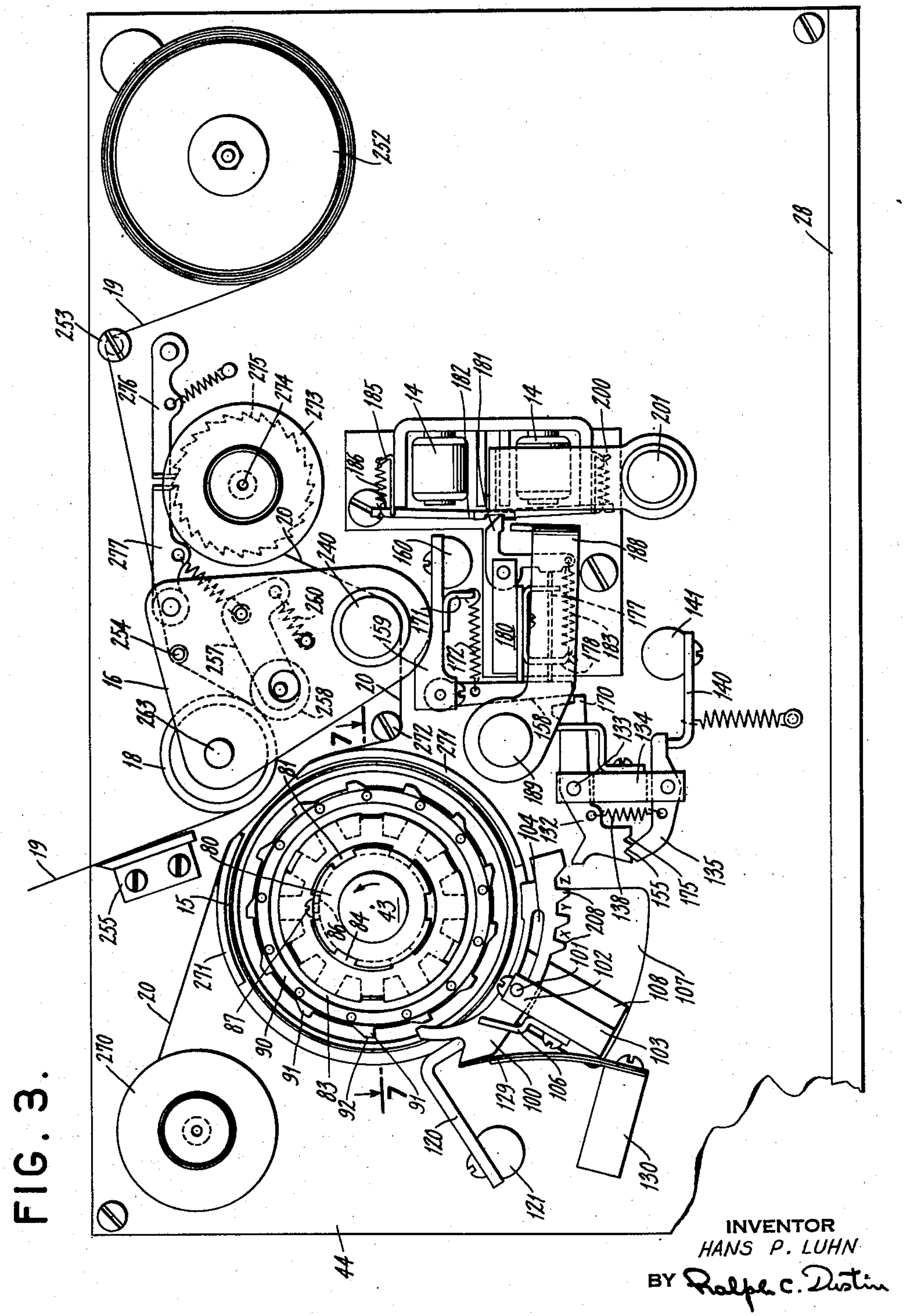
Fig. 3 is an enlarged front elevational view taken on the line 3—3 of Fig. 1.
Figures 7, 8:
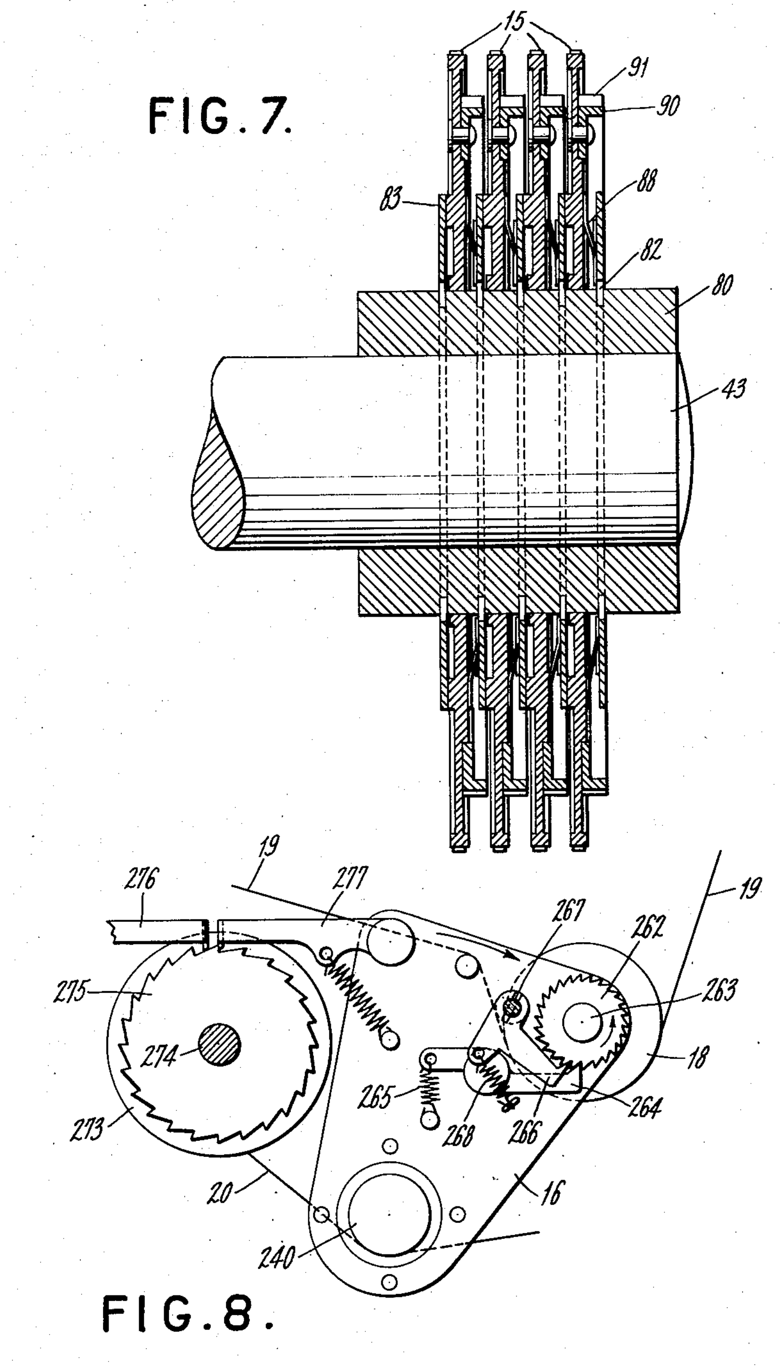

Fig. 7 is an enlarged sectional view of the type wheels taken on the line 7—7 of Fig. 3.

Fig. 8 is an enlarged elevational view of the platen and record tape feeding means shown in Fig. 3, the view being taken in a direction opposite to that of Fig. 3.

Figure 9:
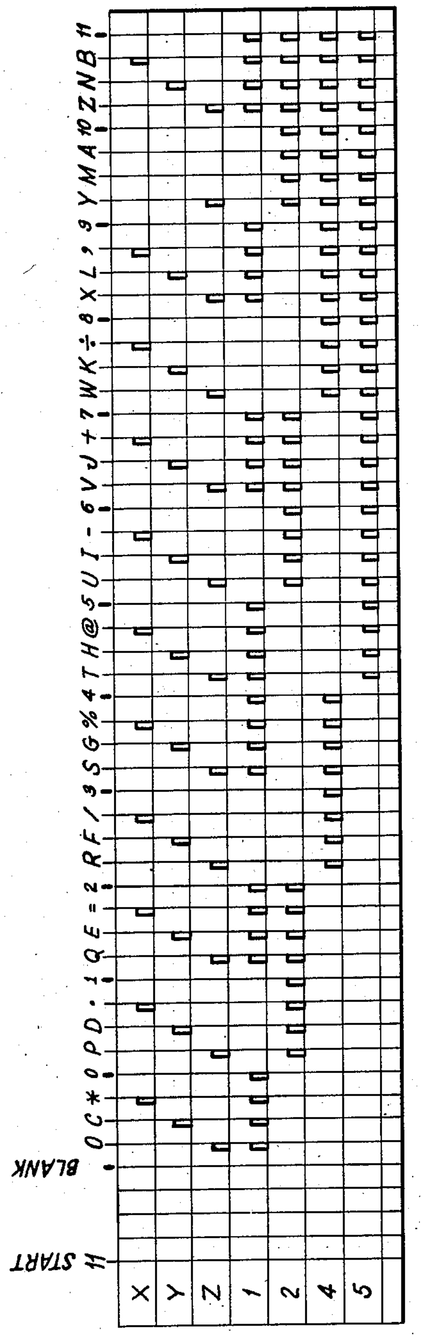

Fig. 9 is a chart showing the perforations for the different characters to be printed, the character being arranged from left to right in the order which they come to printing position.

Figure 10:
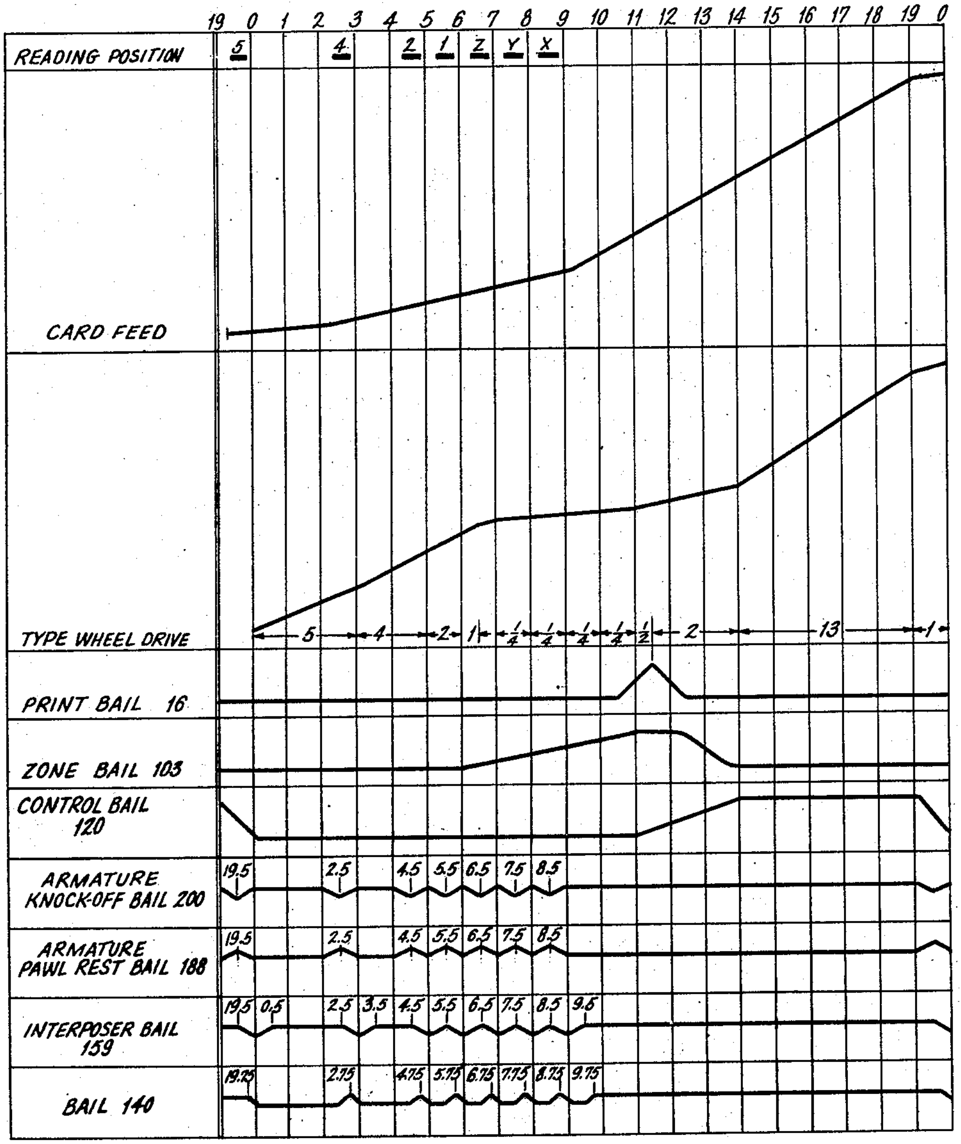

Fig. 10 is a timing diagram.

There is shown in Figs. 1 to 10 a rotary or wheel type printing mechanism which is operable for the printing of numerical, alphabetical, and special characters in response to the sensing of designations, such as punched holes in record cards. A 7-hole code (see Fig. 9) is utilized with the perforations formed at equally spaced index points on the cards, these points being designated as the X, Y, Z, 1, 2, 4 and 5 index points. The X, Y and Z points are referred to as the zone index points, and the 1, 2, 4 and 5 points are referred to as the numeric or subzone points.

The data representations are punched in lateral columns in the record card, and, during operation of the printing mechanism, the punched cards are fed laterally from a hopper (not shown) in any conventional manner, one at a time, with the No. 5 index points first. As the cards are fed from the hopper, they are picked up by variable speed feed rolls 10 (Fig. 6) and advanced between aligned sensing brushes 11 and a contact roll 12, whereby all the card columns are sensed simultaneously. After sensing, the record card is fed to any suitable stacking mechanism (not shown.)

One sensing brush 11 is provided for each of the card columns, and connected in a circuit with each brush is a magnet 14 which is energized upon the sensing of a perforation to effect a releasing of a related type wheel 15 (Figs. 1 and 3) so that it is driven by a variable speed driving means an angular distance which is dependent upon the location of the perforation sensed.

Each type wheel of the printer has its periphery divided into thirteen units or divisions and there are four spaces within each division, or 52 spaces in all, at which type elements may be located. Some of the spaces are left blank, but there is a type element for each of the characters shown in Fig. 9, and these elements are arranged so that they come into printing position in the order reading from left to right in that figure.

By feeding the punched record cards 5's edge first past the sensing brushes, the numeric points on the record card are sensed first, and each type wheel is alternately engaged and disengaged from the variable speed driving means to advance the type wheel a number of divisions equal to the represented value of the index positions at which perforations are sensed. The position of the type wheel is then modified in accordance with the sensed perforations at the zone points on the card, resulting in the positioning at a printing line of the type element corresponding to both the numeric and zone positions punched. An X punch permits the type wheel to advance one type space from its previous numeric selected position. A Y punch permits an advance of two spaces; a Z punch permits an advance of three spaces; and the absence of zone punching permits an advance of four spaces or one division from its previous numeric selected position.

After the type wheels have been positioned in accordance with the related punched data representation, a printing bail 16 (Fig. 3) is rotated to move a roller platen 18 so as to force a paper record tape 19 and an inked ribbon 20 against the "selected" type elements for effecting printing. After printing occurs, the displaced type wheels are returned to their home positions, thereby conditioning the mechanism for the next machine cycle. When the type wheels are in their home positions, the points on the wheels marked "start" in Fig. 9 are at the printing line under the roller platen 18. These points are the same as those to which the wheels are rotated for printing the number 11.

*Driving mechanism*

For driving the card feed rolls, the type wheels, and various operating mechanisms, there is provided a pulley 23 (Fig. 1) secured to a shaft 24 journalled in side plates 25 and 26 which project upwardly from a base plate 28. Pulley 23 is engaged by a belt 29 driven from a pulley 30 on the power shaft 31 of a motor 32, the latter being energized, upon the closing of a switch 33 (Fig. 6), from a power source 35 through conductors 36 and 37.

Fixed to the pulley shaft 24 for rotation therewith is a gear 38 (Figs. 1 and 2) meshing with an annular shaped gear 40 secured to a circular plate 41 rotatably mounted on a shaft 43 which is journalled in side plates 26 and 44. Spacer members 45 hold the two side plates 26 and 44 rigidly in the proper spaced relationship. The gear 38 also meshes a gear 47 secured to an intermediate gear shaft 48 rotatably supported in the side plates 25 and 26. A gear 49 secured to one end of the intermediate gear shaft meshes a drive gear 50 (Fig. 1 and Fig. 6) for driving the variable speed feed roll mechanism which will be described later. Secured to the other end of the shaft 48 is a gear 51 meshing with a gear 52 on a cam shaft 53 which is journalled in the side plates 26 and 44.

Figure 2:
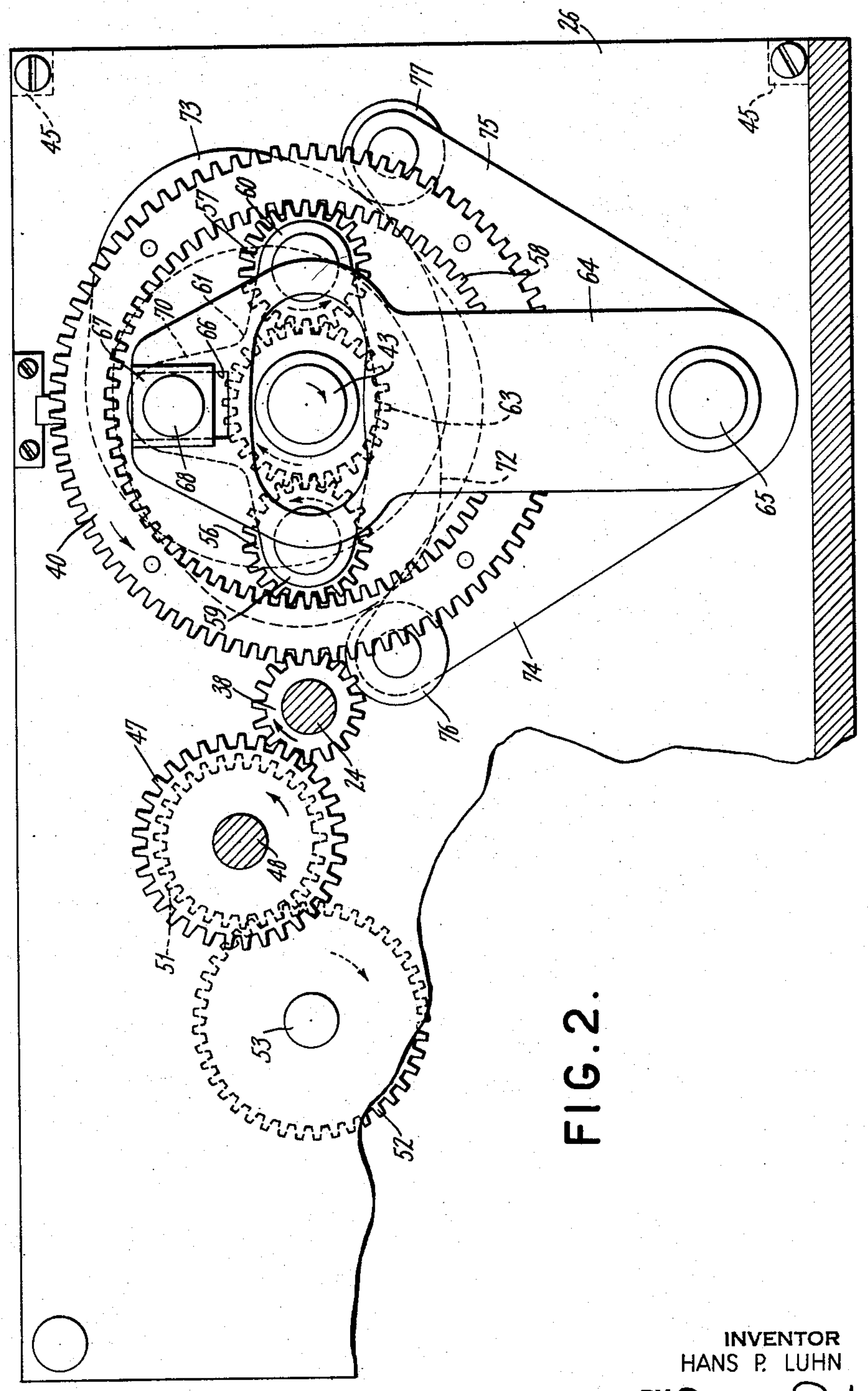
Fig. 2 is an enlarged vertical sectional view taken on the plane of the line 2—2 of Fig. 1 with portions broken away to facilitate illustration.

When the motor 32 is energized, the drive gear 38 rotates clockwise in Fig. 2 and drives the gears 40 and 47 in a counter-clockwise direction. The cam shaft 53 is driven at the same time from the gear 51 in a clockwise direction.

*Type wheel drive*

The type wheels 15 are mounted on the shaft 43 which is driven at a variable speed by the gear 40 acting through a mechanism shown most clearly in Fig. 2. This mechanism comprises a pair of gears 56 and 57 meshing with teeth 58 around the inner periphery of the annular gear 40, and the gears 56, 57 are rotatably mounted on arms 59 and 60 of a spider member 61 which is in turn rotatably supported by the shaft 43. A gear 63 is secured to the shaft 43 and meshes the two gears 56 and 57 to effect a driving of the shaft 43 in a clockwise direction, as viewed in Fig. 2. The shaft 43 is driven at a constant speed as long as the spider 61 remains stationary on shaft 43.

To effect a variable speed driving of the shaft 43, the spider 61 is rocked around the shaft 43 as a center. When the spider is rocked in the same direction (counterclockwise) as the gear 40, the gears 56 and 57 are rotated around their respective axes by the gear 40 at a slower rate, and, as a result, the gear 63 and the shaft 43 are driven at a slower speed. Conversely, as the spider is rocked in a clockwise direction around shaft 43, the gears 56 and 57 are rotated around their respective axes at a faster rate than when the spider is held stationary, and the shaft 43 is accelerated. The rates of acceleration and deceleration are, of course, dependent upon the speed at which the spider is rocked.

For rocking the spider 61, there is provided a member 64 rotatably mounted on a shaft 65 and having at its upper end a slot 66 slidably receiving a block 67. A stud 68 is carried by an upwardly projecting arm 70 on the spider and is rotatably received within an opening in the block 67. The spider arm 70 extends, as shown in Fig. 2, at right angles to the arms carrying the gears 56, 57. It will be appreciated that a rocking of the member 64 results in a rocking of the spider about the shaft 43.

To effect a rocking of the member 64 there are provided complementary cams 72, 73 fixed by suitable means, not shown, to the gear 40 for rotation therewith. Extending from the member 64 are arms 74, 75 carrying rollers 76, 77 which cooperate with the complementary cams. As the gear 40 is driven, the cams 72, 73 rotate and rock the member 64 which, in turn, rocks the spider 61 to effect a driving of the shaft 43 at an accelerating speed and then at a decelerating speed during each machine cycle. The type wheels 15 are mounted upon the shaft 43, as described below, and are frictionally driven by the shaft when released from a holding means.

*Type wheel mounting*

The type wheels 15 are of annular shape and are rotatably mounted, as shown in Figs. 3 and 7, on a sleeve 80 fixed by any suitable means, not shown, to the shaft 43 which is constantly rotated counter-clockwise in Fig. 3 at a variable rate of speed by mechanisms previously described. Extending longitudinally through the outer periphery of the sleeve 80 are three equally spaced grooves 81, and formed at spaced intervals along the sleeve are arcuate grooves 82. An annular plate 83 is provided for each of the arcuate grooves 82, and each plate has three equally spaced inwardly projecting tongue portions 84 which are movable in the longitudinal grooves 81 until the plate is in line with one of the arcuate grooves. The plate is then rotated so that the tongue portions move into the groove 82 for holding the plate against movement longitudinally of the sleeve. A rod (not shown) inserted through an opening in one of the tongue portions of each plate and a recess 86 in the sleeve 80 holds the plates 83 for rotation with the sleeve. A screw 87 is threaded into the sleeve 80 at each end of the recess 86 for holding the rod in place. Each of the type wheels 15 is arranged between two of the plates 83 as shown in Fig. 7, and a spring steel disk 88 is fixed to one of the plates and is held in frictional engagement with the type wheel so that the latter tends to rotate with the sleeve 80 and the shaft 43.

Attached to the side of each type wheel is an annular member 90 having ratchet teeth 91 about its outer periphery. There are thirteen ratchet teeth uniformly spaced on each member 90, and these teeth determine the thirteen divisions or units, mentioned above, within which the spaces for the type elements are located. One of the ratchet teeth on each member has its outer end 92 (Fig. 3) extending outwardly beyond the ends of the other teeth, for reasons to be described later.

*Print control mechanism*

Arranged below the member 90 on each type wheel 15 is a stop pawl 100 (Fig. 3) adapted to engage any one of the ratchet teeth 91 for holding the type wheel stationary while the shaft 43 and the sleeve 80 rotate in a counter-clockwise direction. The stop pawl 100 is selectively and intermittently disengaged and engaged with the ratchet teeth in response to the sensing of subzone or numeric information whereby the type wheel is advanced by the rotating sleeve a varying number of teeth or divisions dependent on the holes sensed. A rod 101 carried by comb-like extensions 102 of a rockable zone bail 103 extends through an elongated arcuate slot 104 in each stop pawl 100 so that the latter is mounted both for pivotal movement and longitudinal movement relative to the bail. To prevent side movement of the pawls, each pawl engages a slot of a comb-like guide member 106 secured to the bail 103, as shown.

The bail 103 extends through an opening 107 in the side plate 44 and has two arm portions 108 (Figs. 1, 4 and 5) rotatably supported by the shaft 43. The upper ends of the arm portions are connected by links 109 to arms 110 fixed to a shaft 112 journalled in the plates 26 and 44. Mounted upon the shaft 112 is a member 114 carrying rollers 115, 116 cooperating with complementary cams 117, 118 on the cam shaft 53. As the complementary cams rotate with the shaft 53, the bail 103 is caused to swing about the shaft 43 as indicated in Fig. 10.

During the portion of each machine cycle in which the points 5, 4, 2, 1 on the cards pass under the sensing brushes 11, the bail 103 is held in the position shown in Fig. 3. Just before the Z points on a card pass under the brushes, the bail 103 is swung downwardly until it reaches a vertical position soon after the X points have passed the brushes. The bail remains in its vertical position until the printing operation has been completed and then it is returned to the position of Fig. 3. As the zone bail approaches the position of Fig. 3, the left hand ends of the stop pawls 100 engage a bail 120 and are cammed by the latter away from the type wheels until the nose of each pawl lies outside all of the ratchet teeth 91 except that having the end 92. All of the type wheels are then free to turn with the shaft 43 until the ratchet teeth with the ends 92 engage the stop pawls. At that time, each type wheel is in its home position and the point on the wheel indicated as "start" in Fig. 9 lies in a position to be engaged by the platen 18.

The bail 120 is connected to a shaft 121 journalled in the plates 26, 44 and attached to the shaft as shown in Fig. 4 is an arm 122 which is connected by a link 123 to an arm 124 rotatably supported by the shaft 112. Mounted on the arm 124 is a roller 126 cooperating with a cam 127 on the shaft 53. This cam is shaped so as to move the bail 120 to the position of Fig. 3 at the same time the stop pawls 100 are moved to the left by the bail 103. The stop pawls are then held by the bail 120 in the position of Fig. 3 until all of the print wheels have had enough time to rotate to their home positions. Just before the beginning of a machine cycle, the bail 120 is rotated in a counter-clockwise direction to the position shown in Fig. 3*a* so as to free the stop pawls for pivotal movement. Springs 129 carried by a lug 130 on the plate 44 act against the stop pawls and move them, when released by the bail 120, toward the type wheels for full engagement with the ratchet teeth 91 having the projecting ends 92.

Figures 3A, 3B:
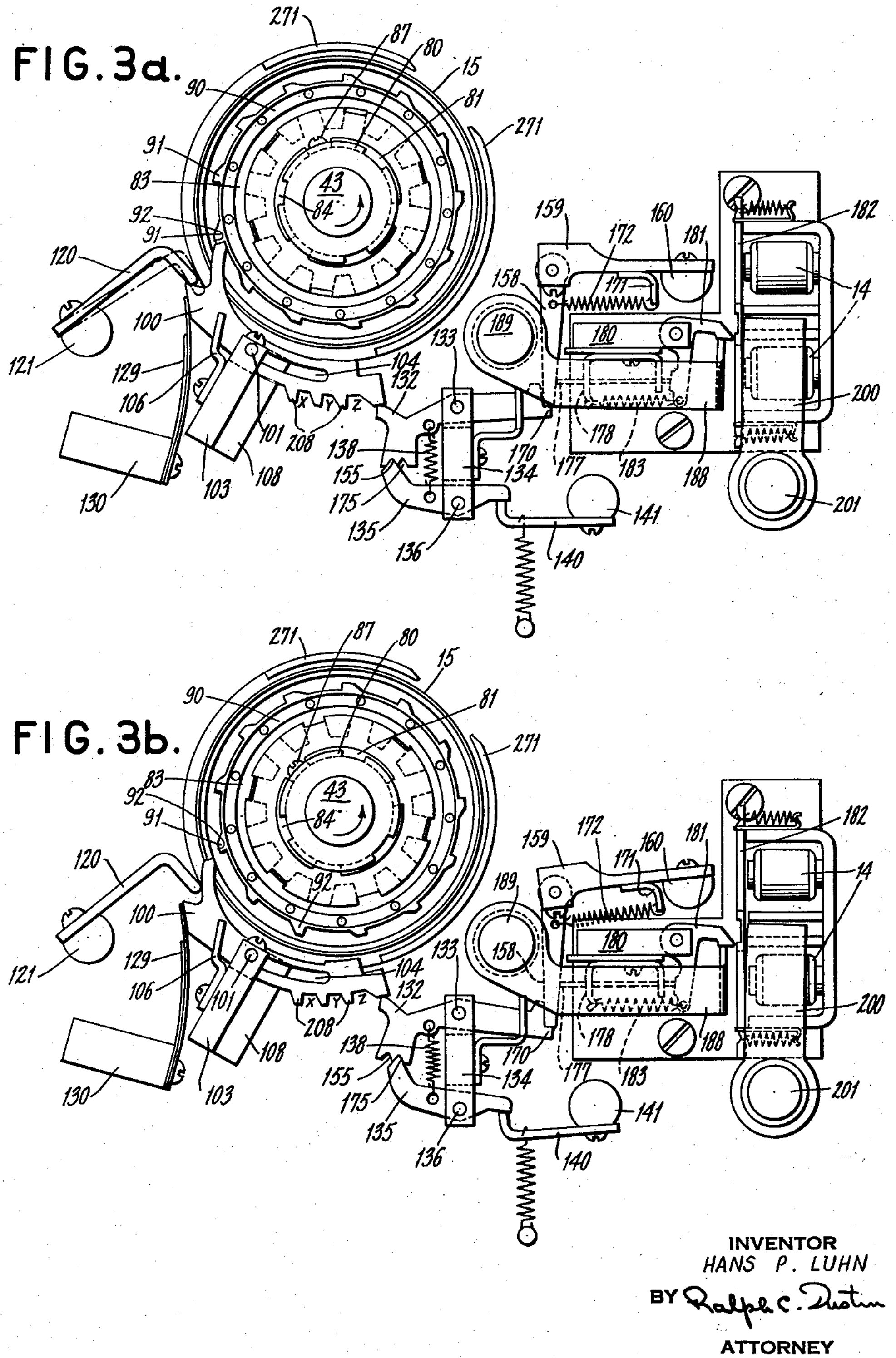
Figure 3C:
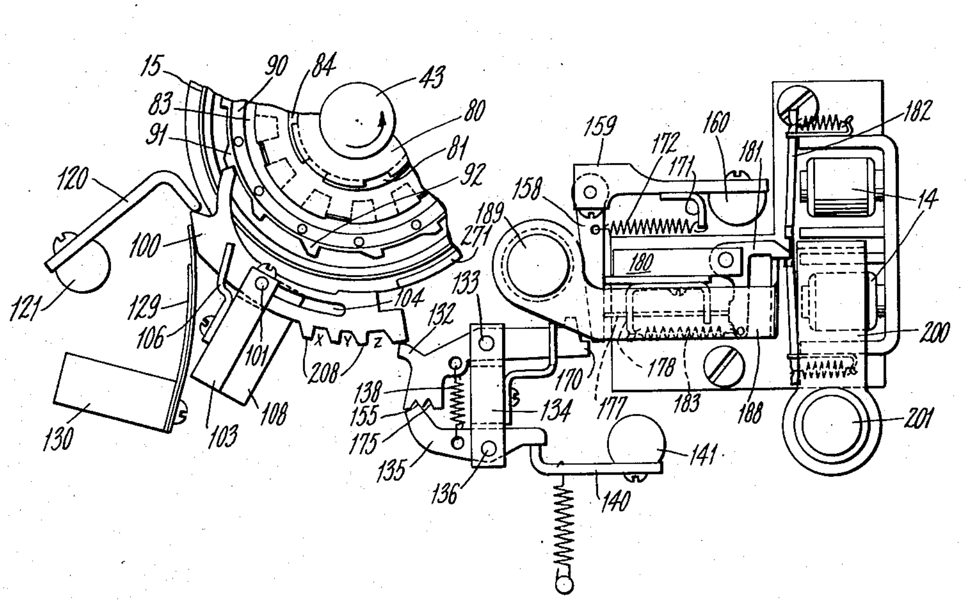

Arranged beneath the right hand end of each stop pawl 100 is an operating pawl 132 pivotally mounted on a rod 133 carried by comb-like extensions of a support member 134 secured to the plate 44. When the stop pawls are moved by the springs 129 to the base of the ratchet teeth after the bail 120 is retracted, the tail ends of the stop pawls engage the operating pawls 132, as shown in Fig. 3*a*. Arranged beneath each operating pawl is a retaining pawl 135 pivotally supported by a pin 136 carried by the support member 134. A spring 138 connected between the pawls 132 and 135 holds the left-hand ends of the latter in engagement with each other.

At the right hand end of the retaining pawl is a bail 140 carried by a shaft 141 journalled in the plate 44 and a plate 139. Referring to Fig. 5, it will be noted that an arm 142 is fixed to the shaft 141 and is pivotally connected at its outer end to a member 143 having a forked end 144 which slidably engages a block 145 loosely mounted on the shaft 53. The member 143 has a reduced portion 147 at its other end extending through an opening in a guide member 148, and a spring 149 surrounds the reduced portion and acts between the guide member and shoulders 150 for holding the member 143 so that a roller 151 carried thereby is in continuous engagement with a cam 153 fixed to the shaft 53.

Figure 3D:
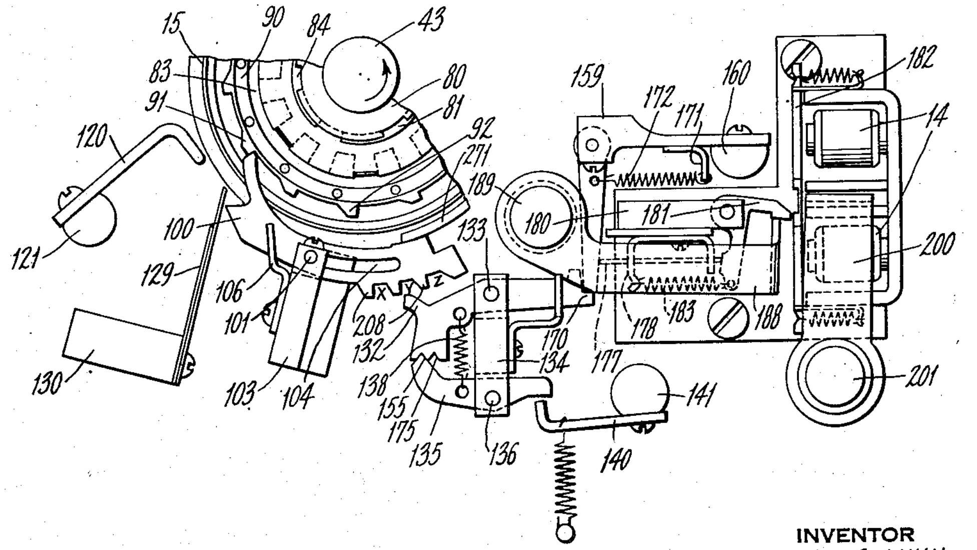

The cam 153 is shaped so as to actuate the bail 140 as indicated in Fig. 10. Before each machine cycle starts, the bail 140 is in the position shown in Fig. 3 and holds the retaining pawl 135 so that its nose is received within a notch 155 in the operating pawl 132. At approximately the same time that the first index point on a card comes under a sensing brush 11, the bail 140 is swung a short distance in a counterclockwise direction to release the retaining pawl as shown in Fig. 3*d*. The bail is then held in its pawl releasing position until the next point on the card comes under the sensing brush. At this time the bail is rocked to the position of Fig. 3 and then back again to its pawl-releasing position. This operation takes place during the sensing of each card index point.

Adjacent the right-hand end of each operating pawl 132 is an interposer 158 pivotally supported at its upper end by a bail 159 connected to a shaft 160 which is journalled in the plates 44 and 139. Fixed to the shaft 160, as shown in Fig. 4, is an arm 161 which is connected by a link 162 to an arm 163 secured to a shaft 164 journalled in the plates 26 and 44. Mounted upon the shaft 164 is another arm 166 (Figs. 1 and 5) carrying a roller 167 which cooperates with a cam 168 on the cam shaft 53. Formed on the operating pawl 132 at its right-hand end in Fig. 3 is a portion 170 over which the interposer 158 is adapted to be moved. Connected between the interposer and a flange 171 on the bail 159 is a spring 172 for holding the interposer normally in a position where it is free from engagement with the pawl portion 170.

As the cam 168 rotates with the shaft 53, the shaft 160 is rocked so as to move the bail 159 in a counterclockwise direction from the position shown in Fig. 3 and then back again to the position of Fig. 3. This movement takes place, as shown in Fig. 10, just after each index point on a card passes under the brush 11. The interposer 158 moves downwardly with the bail 159 and, if the interposer is held free of the operating pawl 132, no shifting of the type wheel takes place. If the interposer is positioned, however, over the portion 170 of the operating pawl, the latter is swung about its pivot 133 in a clockwise direction. At this time the stop pawl 100 is released from the bail 120 and is held by the spring 129 in a position with its nose at the base of a ratchet tooth 91 and its tail end engaging the operating pawl 132 (see Fig. 3*a*). A swinging of the operating pawl by the interposer causes the stop pawl to be rocked about the rod 101, as shown in Fig. 3*b*, until the nose of the stop pawl is free of the ratchet teeth and the type wheel is free to rotate with the shaft 43. Each time that the interposer is moved downwardly, the bail 140 is also rocked downwardly to free the retaining pawl 135. If the operating pawl 132 is rocked by the interposer, the retaining pawl 135 is also rocked by the spring 138 until its nose engages a notch 175 in the operating pawl and holds the latter in its rocked position even though the interposer is lifted immediately by the bail 159. Just before the interposer is moved downwardly again, the bail 140 is rocked upwardly to release the pawl 135 from the notch 175, providing the latter engages such notch by reason of a previous rocking of the pawl 132. This causes the pawls 132 and 135 to be returned to the positions shown in Fig. 3, and the stop pawl 100 is released to engage one of the ratchet teeth 91 on the type wheel, the ratchet tooth engaged being dependent upon the speed at which the type wheel is rotated while the stop wall is held retracted.

For moving the interposer over the portion 170 of the operating pawl, there is provided for each interposer a rod 177 slidably supported for longitudinal movement by a bracket 178 which is attached to the lower side of a block 180 projecting from the side of the plate 44. Pivotally supported between comb-like extensions on the block is an armature pawl 181 adapted to engage the rod 177 for moving it against the interposer 158. The pawl 181 is engageable by an armature latch 182 for holding it free of the rod 177 against the action of a spring 183 connected between the lower end of the armature pawl and the bracket 178. The armature latch is pivotally supported by a member 185 in a position to be attracted by the magnet 14 corresponding to the order of the type wheel controlled thereby. A spring 186 urges the armature latch to a position for latching the pawl 181 in the position of Fig. 3. The magnets and the armature latches are staggered as shown in order that the parts controlled thereby may be arranged in a compact manner.

After the armature pawls have been operated by an energizing of the magnets 14, it is necessary that they be returned again to positions where they may be latched. To accomplish this there is provided a bail 188 underlying the pawls 181 and connected to a shaft 189 journalled in the plates 44 and 139. Attached to the shaft 189 (see Fig. 5) is an arm 190 which is connected by a link 191 to the lower end of a lever 192 loosely mounted upon the shaft 160. Mounted upon the lever 192 is a roller 193 cooperating with a cam 195 on the shaft 53.

For holding the roller against the cam, there is provided, a spring 196 connected between an arm 197 on the shaft 189 and an arm 198 on the shaft 121. It will be noted that the action of the spring on the arm 198 results also in a holding of the roller 126 (Fig. 4) against the cam 127.

The cam 195 is shaped so as to hold the bail 188 in its lower position (Fig. 3) at all times except when the card index points approach the brushes 11. Just before the index points reach the brushes, the bail 188 is rocked upwardly to return the pawls 181 to positions where they may be latched. All of the pawls 181 are held slightly above their latched positions as the index points pass under the brushes so that the armature latches 182 are free for actuation by the magnets 14. While the index points are being sensed, the bail 188 is moved downwardly again, and the pawls corresponding to the energized magnets follow the bail and actuate their pins 177 for positioning the interposers over the operating pawls 132. Just after sensing has been completed, the bail 159 is rocked to move the interposers downwardly for actuating the operating pawls corresponding to the magnets 14 which were energized.

In order to assist a relatching of the pawls 181 when returned to their raised positions, there is provided a knock-off bail 200 connected to a shaft 201 and adapted to be operated for moving the armature latches 182 away from the magnets 14. The shaft 201 is journalled in the plates 44, 139 and has connected to it, as shown in Fig. 5, an arm 202 carrying a roller 203 cooperating with a cam 204 on the shaft 53. This roller is held in engagement with its cam by a spring 206 connected between the arm 202 and one of the spacer members 45. The cam 204 is shaped to actuate the bail 200 for knocking off the armature each time the bail 188 is rocked upwardly.

As mentioned above, the zone bail 103 is in the position shown in Fig. 3 during the portion of each cycle when the index points 5, 4, 2 and 1 pass under the brushes 11. Just before the beginning of each cycle, the bail 120 is rocked to the position of Fig. 3*a* for releasing the stop pawl 100 so that its tail end engages the nose of the operating pawl 132. If the operating pawl is actuated due to a sensing of a perforation at any one of the numeric index points, the stop pawl is rocked to the position of Fig. 3*b*, thereby releasing the type wheel for rotation with the shaft 43. Just before the Z points on a card are sensed, the bail 103 begins to rotate counter-clockwise to present notches 208 in the stop pawl to the nose of the operating pawl. These notches have been designated X, Y and Z, and they come into position to receive the nose of the pawl 132 in synchronism with the operations of the latter by the sensing of perforations at corresponding index points. It will be appreciated that the stop pawl is held in engagement with one of the ratchet teeth 91 when the bail 103 rotates counter-clockwise, and the action of the tooth on the pawl causes the latter to follow the bail. The type wheel also follows the stop pawl until its motion is arrested. If the operating pawl 132 is operated by a sensing of a perforation at the Z index point, the nose of the pawl engages the Z notch 208 and stops the pawl 100 and the type wheel after the latter has advanced only one type space. Engagement of the pawl with the Y or X notches results in an advancement of the type wheel two or three type spaces, respectively. If there is no perforation at one of the X, Y, Z points, the stop pawl follows the bail 103 until it reaches its vertical position. This permits a rotation of the type wheel four type spaces or one division, the distance between adjacent ratchet teeth. As the bail moves down from the position of Fig. 3, the stop pawl 100 is moved away from the spring 129, as shown in Fig. 3*d*. Before the pawl reaches a position where its Z notch 208 may receive the pawl 132, the right-hand end of the pawl 100 rides over the guide plate 271 so that the pawl is locked against release from the tooth 91 by the action of the pawl 132.

*Card feed mechanism*

The cards are advanced, as mentioned above, at a variable speed by feed rolls 10 (Fig. 6) to sensing brushes 11. The rolls 10 are mounted on a shaft 212 and cooperate with idler rolls 214 on a shaft 215. The shaft 212 extends through an opening 216 in a stationary plate 217 and is adapted to be driven by the gear 50 which is mounted on a shaft 218.

When the drive motor 32 is energized, the gear 50 and the shaft 218 are driven counter-clockwise at a constant speed by the gear 49 on the idler shaft 48, as previously explained. A member 220 is connected at one end by a stud 221 to an arm 222 fixed to the shaft 218, and formed in this member is an arcuate slot 224 through which the shaft 212 extends. The opposite end of the member 220 is provided with a slot 225 receiving a stud 226 carried by an arm 227 on the shaft 212. Formed in the plate 217 is a cam groove 228 receiving a roller 230 on a stud 231 carried by the member 220.

As the gear 50 rotates, it tends to turn the member 220 about the shaft 212 at a constant speed. The roller 230 follows the cam groove 228, however, and shifts the member 220 transversely of the shaft 212 to effect an acceleration or deceleration in its rate of turning. The shaft 212 is, therefore, rotated so as to advance the cards at a variable speed, as shown in Fig. 10.

For energizing the magnets 14 upon the sensing of perforations in the card, there is provided a circuit extending from the switch 33 through a conductor 234, cam contacts 235 and a conductor 236 to a brush 237 engaging the contact roll 12. The cam contacts 235 are closed by a cam 238 just after the perforations, if any, are sensed, and the contacts are opened again just before the brushes 11 are disengaged from the contact roll. The cam 238 is connected to the cam shaft 53 so that it completes one revolution in each machine cycle.

*Card feed and type wheel timing*

Referring to Fig. 10, it will be noted that each machine cycle is divided in twenty equal divisions or cycle points. The card feeding means not shown, and the feed rolls 10 operate to advance each card so that its number 5 index points come under the sensing brushes 11 just before the 0 cycle point is reached. Even though the index points are evenly spaced on the card, the feed rolls 10 require three cycle points for advancing the card from the position where the number 5 index points are under the brushes to the position where the number 4 index points are under the brushes. Two cycle points are required for advancing the card from the number 4 index point to the number 2 index point, and then only one cycle point is required for advancing the card through each of the 1, Z, Y and X index points.

The shaft 43 for driving the type wheels 15 is also rotated at a variable speed as described above. The speed of this shaft during the three cycle points between the sensing of the number 5 and 4 index points on a card is such as to advance a type wheel five divisions or the distance of five ratchet teeth 91. Since each type wheel is in its home position, i. e., in a position with the point marked "start" in Fig. 9 lying beneath the roller platen 18, at the beginning of each cycle, then an energizing of its magnet 14 by the sensing of a perforation at the number 5 index point will result in a turning of the wheel through five divisions to the point where the digit 3 lies under the platen. The speed of the shaft 43 after the number 4 index point is sensed is such as to advance the type wheel four divisions if it is released by the sensing of a perforation at the number 4 point. It will be seen that this shifting of the wheel four divisions takes place during only two cycle points, the time allotted between the sensing of the number 4 and 2 index points. The sensing of perforations at the number 2 or 1 points results in a shifting of the type wheel 2 or 1 divisions, respectively, and either shift takes place during one cycle point. During the sensing of the index points Z, Y, X, the zone bail 103 is rocked so as to advance the type wheel one type space or ¼ of one division after the sensing of each point. This bail is rocked another type space after the X index point has passed the brush 11 so that a failure to sense a perforation at any zone point results in an advance of the type wheel one division or four type spaces.

Assuming that perforations are sensed at the number 4 and 1 index points, this being the punching of a card for the digit 4, as shown by Fig. 9. Upon the sensing of the number 4 hole the type wheel is released to rotate 4 divisions from its home position. This brings the number 2 type element under the platen 18. A sensing of the number 1 hole then results in a turning of the type wheel one division to bring the type element for the digit 3 under the platen. During the zoning period, the type wheel is advanced one more division since no zone perforation is sensed. This brings the type element for the digit 4 under the platen. If a perforation had been sensed at the Y index point in addition to the 4 and 1 points, then the type wheel would have been stopped by the operating pawl 132 engaging the Y notch 208 after the wheel had advanced two type spaces from the position it assumed as a result of a sensing of the 4 and 1 holes. The wheel is then in a position with the type element for the letter G underlying the platen. The positioning of the type wheels for printing the other characters take place in a similar manner.

*Printing mechanism*

After the type wheels have been set up, it is necessary that the roller platen 18 be actuated to force the record tape 19 and the inked ribbon 20 against the type element beneath it so as to effect a printing of the character. For accomplishing this, the print bail 16 is connected to a shaft 240 journalled in the plates 44, 139, and loosely mounted on the shaft 240, as shown in Figs. 1 and 5, is a member 241 carrying a roller 242 which cooperates with a cam 243 on the shaft 53. Fixed to the shaft 240 is an arm 245 which is adjustably connected by screws 246 and 247 to the member 241. The screw 246 extends through a clearance hole in the arm 245 and is threaded into an opening in the member 241, while the screw 247 is threaded through a hole in the arm 245 and abuts the member 241. A spring 248 is connected between the upper end of the arm 245 and a stud 249 on the plate 44 for holding the roller 242 in yielding engagement with the cam 243. The cam 243 is shaped so as to rock the print bail 16 toward the type wheels as soon as they have had time to be adjusted in response to reading of the cards.

The paper record tape extends, as shown in Fig. 3, from a supply reel 252 over a stationary guide 253, over a guide 254 on the print bail 16, under the roller platen 18, and over a stationary guide 255 secured to the plate 44. A bell crank 257 is pivotally mounted on the print bail and carries a roller 258 which holds the record tape in engagement with the platen due to the action of a spring 260 on the bell crank. By rotating the platen a slight amount each machine cycle in a counter-clockwise direction in Fig. 3, the record tape is advanced to obtain a printing of successive record card information on separate lines.

For rotating the platen 18, a ratchet wheel 262 (Fig. 8) is connected to a shaft 263 on which the platen is mounted. A dog 264 is pivotally supported by the print bail 16 and is urged by a spring 265 into engagement with the ratchet wheel for holding the latter against rotation in a clockwise direction. Another dog 266 is pivotally supported by a stud 267 on the plate 44 and is held in engagement with the ratchet wheel by a spring 268. As the print bail rocks in a clockwise direction in Fig. 8, the dog 266 slides over the teeth of the ratchet wheel since it is held by the dog 264. When the print bail rocks in a counter-clockwise direction, however, the dog 266 causes the ratchet wheel to turn while the dog 264 slides over its teeth. The platen turns with the ratchet wheel and advances the record tape.

The inked ribbon 20 extends from a supply spool 270 over guide plates 271 at the periphery of the print wheels, under a stationary guide 272, under the shaft 240 and over a take-up spool 273 loosely mounted on a stub shaft 274 extending from the plate 44. Fixed to the take-up spool is a ratchet wheel 275 which is engaged by a dog 276 mounted on a stationary pivot, and a dog 277 mounted on a pivot carried by the print bail 16. As the print bail rocks in a clockwise direction, the dog 277 turns the take-up reel so as to feed the ribbon past the type wheels. The dog 276 holds the take-up reel from turning while the print bail is rocked into engagement with the type wheels.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. A printing machine operable in response to the sensing of designations at uniformly spaced index points of different value on a record comprising, in combination, a sensing station, means for advancing said record at a varying speed past said sensing station so as to present said index points successively for sensing at the end of different time intervals, a type carrier having a plurality of type elements, driving means for said type carrier, said driving means operating continuously at varying speeds, a frictional connection between said driving means and said type carrier, means normally locking said carrier against movement with said driving means, means operable in response to the sensing of a designation at any one of said index points for releasing said locking means, and means for engaging said locking means again before the next index point arrives at said sensing station, the speed of said driving means and the time intervals being such that said type carrier is moved distances proportional to the values of the index points at which designations are sensed.

2. A printing machine operable in response to the sensing of designations at index points uniformly spaced on a record and having different weighted values comprising, in combination, a sensing station, means for advancing said record past said sensing station at a varying speed so that different time intervals are allowed between the sensing of designations at different index points, a type carrier having a plurality of type elements, means operating in response to the sensing of a designation at any one of said index points for moving said type carrier to different printing positions, said last mentioned means operating at different speeds following the sensing of designations at different index points, and means operating after a designation is sensed at any one of said index points for stopping said type carrier by the time the next index point reaches said sensing station, the speed of said type carrier moving means and the different time intervals allowed between the advancing of index points past said sensing station being such that said type carrier is moved distances proportional to the weighted values of said index points upon the sensing of perforations.

3. A printing machine operable in response to the sensing of designations at index points uniformly spaced on a record and having different weighted values comprising, in combination, a sensing station, means for advancing said record past said sensing station at a varying speed so that different time intervals are allowed between the sensing of designations at different index points, a type carrier having a plurality of type elements, driving means for said type carrier, said driving means operating continuously at varying speeds, a frictional connection between said driving means and said type carrier, means normally locking said carrier against movement with said driving means, means operable in response to the sensing of a designation at any one of said index points for disengaging said locking means, and means for engaging said locking means again by the time the next index point reaches said sensing station, the speed of said driving means and the time intervals allowed between the advancing of adjacent index points past said sensing station being such that said carrier is moved distances proportional to the weighted values of the index points upon the sensing of designations.

4. A printing machine operable in response to the sensing of perforations at uniformly spaced index points on a record comprising, in combination, a sensing station, means for advancing said record so as to present said index points successively to said sensing station, a type wheel having a plurality of type elements, a member fixed to said type wheel and having a plurality of uniformly spaced ratchet teeth, driving means for said type wheel, said driving means operating continuously at a varying speed, a frictional connection between said driving means and said type wheel, a stop pawl engageable with said ratchet teeth for holding said type wheel against movement with said driving means, means operable in response to the sensing of a perforation for disengaging said stop pawl from said ratchet teeth, means for holding said stop pawl disengaged from said ratchet teeth, and means operating after each of said index points passes said sensing station for releasing said holding means before said disengaging means can operate from the sensing of a perforation at the next index point.

5. The machine of claim 4 in which one of said ratchet teeth extends outwardly beyond the others, and including means operating after completion of a printing operation for moving said stop pawl outwardly beyond the ends of all of said ratchet teeth except that which projects beyond the others, whereby said type wheel is returned to a home position before another printing operation is started.

6. The machine of claim 4 including a bail pivotally supporting said stop pawl, means for rocking said bail while certain ones of said index points are passing said sensing station, and means operating in response to the sensing of a perforation at any one of said certain index points for stopping said bail.

7. A printing machine operable in response to the sensing of perforations at index points uniformly spaced on a record and having different weighted values comprising, in combination, a sensing station, means for advancing said record past said sensing station at a varying speed so that different time intervals are allowed between the sensing of perforations at different adjacent index points, a type wheel having a plurality of type elements, a member fixed to said wheel and having uniformly spaced ratchet teeth, driving means for said type wheel, said driving means operating continuously at a varying speed, a frictional connection between said driving means and said type wheel, a stop pawl engageable with said ratchet teeth for holding said type wheel against movement with said driving means, means operable in response to the sensing of a perforation for disengaging said stop pawl from said ratchet teeth, means for holding said stop pawl disengaged from said ratchet teeth, and means operating to release said holding means as each of said index points approaches said sensing station, the speed of said driving means and said record advancing means being such that said type wheel is moved distances proportional to the weighted values of said index points upon the sensing of perforations.

8. A printing machine operable in response to the sensing of perforations at index points uniformly spaced on a record comprising, in combination, a sensing station, means for advancing said record so as to present said index points successively to said sensing station, a type wheel having a plurality of type elements, a member fixed to said type wheel and having uniformly spaced ratchet teeth, driving means for said type wheel, a frictional connection between said driving means and said type wheel, a stop pawl engageable with said ratchet teeth for holding said type wheel against movement with said driving means, a bail pivotally supporting said stop pawl, means for rocking said bail from a home position while certain ones of said index points are passing said sensing station, an operating pawl engageable with said stop pawl when said bail is in its home position for disengaging said stop pawl from said ratchet teeth, means operable in response to the sensing of a perforation for actuating said operating pawl, and notches formed in said stop pawl for receiving said operating pawl as said bail is rocked from its home position and said operating pawl is actuated by said last mentioned means.

References Cited in the file of this patent

UNITED STATES PATENTS

| Number | Name | Date |
|---|---|---|
| 1,909,550 | Pierce | May 16, 1933 |
| 1,933,331 | Lake | Oct. 31, 1933 |
| 2,016,682 | Mills | Oct. 8, 1935 |
| 2,076,713 | Ford | Apr. 13, 1937 |
| 2,090,920 | Stuivenberg | Aug. 24, 1937 |
| 2,157,035 | Torkelson | May 2, 1939 |
| 2,181,996 | Knutson | Dec. 5, 1939 |
| 2,199,561 | Fuller | May 7, 1940 |
| 2,227,143 | Knutsen | Dec. 31, 1940 |
| 2,386,422 | Beattie | Oct. 9, 1945 |
| 2,415,279 | Daly | Feb. 4, 1947 |
| 2,438,071 | Page | Mar. 16, 1948 |